May 30, 1961  C. LIFKA  2,986,060

CONNECTOR FITTINGS FOR THIN WALL CONDUIT

Filed June 22, 1959

INVENTOR.
CHARLES LIFKA
BY Cullen & Centor
ATTORNEYS

# United States Patent Office 2,986,060
Patented May 30, 1961

2,986,060

CONNECTOR FITTINGS FOR THIN WALL CONDUIT

Charles Lifka, 20,000 Sherwood Ave., Detroit, Mich.

Filed June 22, 1959, Ser. No. 822,052

1 Claim. (Cl. 85—36)

This application relates to connector fittings for thin wall conduit and particularly to connector fittings of the character shown in a prior patent to Langley and Warring, No. 2,458,276 of January 4, 1949.

An object of the present invention is to improve the fitting shown in said patent, the specific improvement being in the dishing of the gripping ring forwardly, directing the teeth of said ring forwardly. The result of this is to decrease the resistance offered by the fitting when an attempt is made to push or hammer or tap the fitting into a piece of thin wall conduit or tubing. It happens that such conduit is made by a number of manufacturers and the outer diameter of such conduit varies within a substantial range. Particularly when the outer diameter is on the maximum side of the permitted range of variation, the resistance offered by the conduit to the tapping of the fitting onto the conduit in some instances was exceedingly great with the result that distortions and collapse of the ferrule threads often arose, resulting in the fitting being locked on the tubing and yet with its threads injured so that the fitting was no longer suitable for use.

By dishing the gripping ring during the manufacture of the fitting so that when the fitting goes out to a customer to be used, the ring is dished, the fitting can be used with even the largest of the permissive outer diameters of tubing without excessive and fatal resistance.

A further object is to provide a fitting having a gripping ring with teeth and with such teeth slit whereby to increase the flexibility of the dished gripping ring.

Further objects of the invention will best be understood upon reference to the appended specification and the attached drawings.

Figure 1:
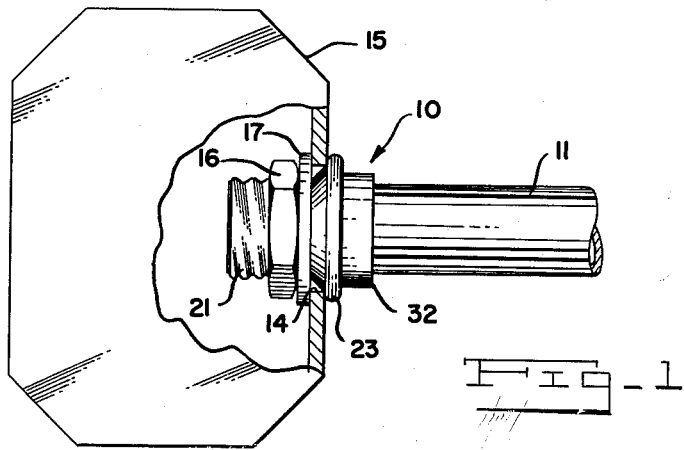
Fig. 1 illustrates the fitting in use on a thin wall conduit and in place in a connector box.
Figures 2, 3:
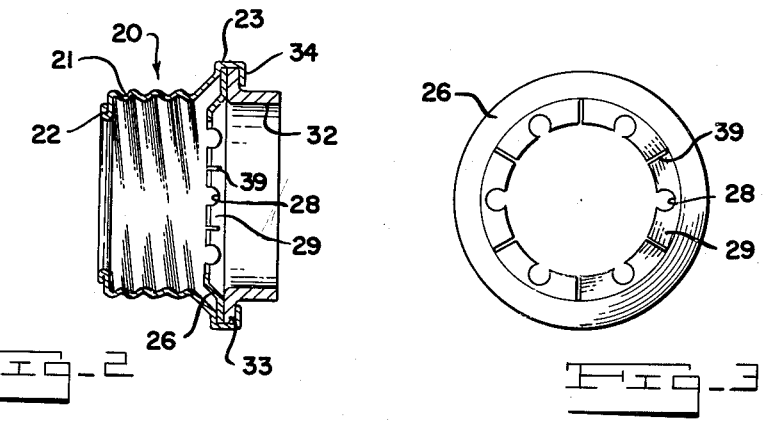
Fig. 2 is an enlarged sectional view of the fitting per se.
Fig. 3 is a view of the gripping ring, per se.
Figure 4:
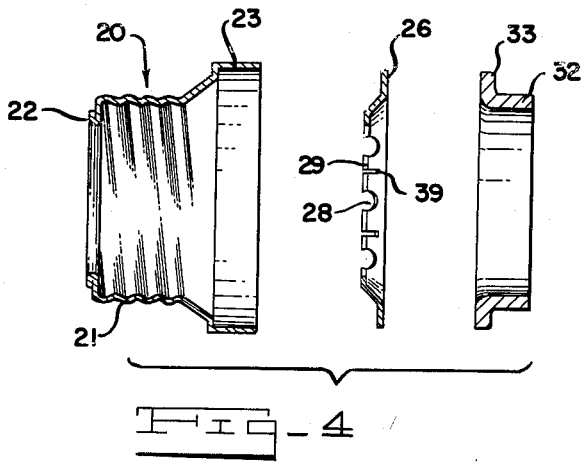
Fig. 4 shows the parts before assembly.

A fitting 10 is applied to the end of a piece of conduit 11 known as thin wall conduit or tubing and so applied is inserted into a hole 14 of a connector or outlet box 15, and a lock nut 16 is threaded on the fitting to lock the parts in place in the box, a washer 17 also sometimes being used.

The fitting of the invention and of the Patent No. 2,458,276 comprises an externally threaded tubular ferrule 20 of sheetmetal having rolled threads 21 and having its forward edge inwardly flanged at 22 and its rear edge outwardly bulged at 23.

Fitting 10 also includes a sheetmetal gripping ring 26 in the outwardly bulged portion 23 and formed of thin springy hardened steel and having its inner edge notched at intervals as shown at 28 to provide between them gripping teeth 29.

Fitting 10 also includes a guide sleeve 32 having its forward edge flanged outwardly at 33 and positioned with gripping ring 26 in outwardly bulged portion 23, with such outwardly bulged portion having its rear edge turned inwardly and spun tightly over gripping ring 26 as at 34 and flange 33 of sleeve 32 to maintain the parts in assembly.

The gripping ring 26 grips tightly on the thin wall conduit or tubing 11 and locks the fitting non-removably and firmly to the tubing.

The improvement of this application is found in the fact that gripping ring 26 is dished forwardly as shown to direct teeth 29 forwardly. Further, in the specific form illustrated, gripping teeth 29 are radially slitted as shown at 39 between notches 28 to increase the flexibility of teeth 29.

By dishing gripping ring 26 forwardly as shown, fitting 10 can be applied to a piece of tubing 11 with considerably less resistance being offered by the tubing than where the ring is flat as shown in the patent. Despite the reduction of resistance in this respect, the fitting, in its improved form, locks itself to the tubing firmly and non-removably equally as in the case where the gripping ring is flat.

Now having described the connector herein disclosed, reference should be had to the claim which follows.

I claim:

A conduit gripping ring formed of an initially flat, circular disc made of thin, springy sheet metal and having a central circular opening of a diameter which is smaller than the outside diameter of a conduit to be fitted into said opening; the disc being formed into three uniform radial lengths, annular portions, namely, a continuous middle portion located approximately midway between the disc outer peripheral edge and the inner peripheral edge which defines the opening, an outer peripheral edge portion, and an inner peripheral edge portion, the middle portion being bent into a truncated conical shape whose large base is formed integral with the outer peripheral edge portion and whose small base is formed integral with the inner peripheral edge portion, with the outer peripheral edge portion being continuous, flat and radially outwardly extending, and in a plane which is perpendicular to the axis of the disc; the inner peripheral edge portion being continuous, flat, radially inwardly extending, and in a plane which is perpendicular to the axis of the disc but spaced from the plane of the outer peripheral edge portion; a plurality of identical, substantially circular shaped notches formed in the inner peripheral edge portion, the notches opening into the circular central opening of the disc, with the notches being uniformly spaced apart around the periphery of said central opening and with the distance between the notches being considerably greater than the circumferentially measured width of each notch, and a narrow, radially directed slit formed in the inner peripheral edge portion midway between each adjacent pair of notches, and the peripheral edge defining the central opening of the disc thus being formed as a circular line, unbroken except by the narrow slits and the notches, and the segment of said circular line between each adjacent slot and notch being longer than the circumferential width of notch, thus forming a relatively long smooth edge line for frictionally gripping against the outer surface of a conduit fitted into the circular opening without cutting the conduit.

References Cited in the file of this patent

UNITED STATES PATENTS

| | | |
|---|---|---|
| 1,675,277 | Roe | June 26, 1928 |
| 1,799,941 | Wulle | Apr. 7, 1931 |
| 2,375,728 | Cadwallader | May 8, 1945 |
| 2,458,276 | Langley | Jan. 4, 1949 |
| 2,484,192 | Squiller | Oct. 11, 1949 |
| 2,503,094 | Buchanan | Apr. 4, 1950 |
| 2,568,584 | Hartman | Sept. 18, 1951 |
| 2,831,711 | Leadbetter | Apr. 22, 1958 |